(12) United States Patent
Mukai

(10) Patent No.: US 8,225,833 B2
(45) Date of Patent: Jul. 24, 2012

(54) PNEUMATIC TIRE

(75) Inventor: Tomoyuki Mukai, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 129 days.

(21) Appl. No.: 12/739,188

(22) PCT Filed: Oct. 16, 2008

(86) PCT No.: PCT/JP2008/068751
§ 371 (c)(1), (2), (4) Date: Apr. 22, 2010

(87) PCT Pub. No.: WO2009/054310
PCT Pub. Date: Apr. 30, 2009

(65) Prior Publication Data
US 2010/0236680 A1    Sep. 23, 2010

(30) Foreign Application Priority Data
Oct. 23, 2007    (JP) ................................. 2007-275451

(51) Int. Cl.
*B60C 11/03* (2006.01)
*B60C 11/12* (2006.01)
*B60C 11/13* (2006.01)

(52) U.S. Cl. ......... 152/209.27; 152/209.21; 152/209.25; 152/209.28; 152/209.18

(58) Field of Classification Search ............ 152/209.27, 152/209.28; D12/549, 550, 559, 564, 565
See application file for complete search history.

(56) References Cited

U.S. PATENT DOCUMENTS 5,665,184 A * 9/1997 Fukumoto ................. 152/209.15
D450,032 S * 11/2001 Heinen ........................ D12/550
6,340,041 B1 * 1/2002 Sugihara et al. ............ 152/209.5
6,705,366 B2 * 3/2004 Himuro ..................... 152/209.15
(Continued)

FOREIGN PATENT DOCUMENTS
EP    1872973 A1    1/2008
(Continued)

OTHER PUBLICATIONS
English Language Machine Translation of JP2005-119398 (2005).*
(Continued)

*Primary Examiner* — Richard Crispino
*Assistant Examiner* — Philip N Schwartz
(74) *Attorney, Agent, or Firm* — Birch, Stewart, Kolasch & Birch, LLP

(57) ABSTRACT

A pneumatic tire capable of improving drainage performance and noise-reduction. The pneumatic tire comprises a tread portion being provided with central longitudinal grooves 3a, shoulder longitudinal grooves 3b, and intermediate land portions 4a each defined between the central longitudinal groove 3a and said shoulder longitudinal groove 3b. The intermediate land portion 4a is provided with a thin groove 5 extending the tire at a position away axially inside from the shoulder longitudinal groove 3b, intermediate slant grooves 6 each extending from the thin groove 5 toward said central longitudinal groove 3a while inclining terminating without being connected to the central longitudinal groove 3a, and connection grooves 7 each extending so as to connect between the adjacent intermediate slant grooves 6 in the circumferential direction of the tire. Each of the connection groove 7 inclines in the same direction as the intermediate slant groove 6 at an angle smaller than that of the intermediate slant groove 6.

5 Claims, 8 Drawing Sheets

U.S. PATENT DOCUMENTS

| | | | |
|---|---|---|---|
| 2002/0005238 A1* | 1/2002 | Boiocchi et al. | 152/209.27 |
| 2006/0137791 A1 | 6/2006 | Miyabe et al. | |
| 2006/0162831 A1 | 7/2006 | Ishida | |
| 2010/0326577 A1 | 12/2010 | Iwai | |

FOREIGN PATENT DOCUMENTS

| | | |
|---|---|---|
| JP | 7-285303 A | 10/1995 |
| JP | 8-25915 A | 1/1996 |
| JP | 2001-206017 A | 7/2001 |
| JP | 2004-168142 A | 6/2004 |
| JP | 2004-168189 A | 6/2004 |
| JP | 2004-262312 A | 9/2004 |
| JP | 2005-119398 A | 5/2005 |
| WO | 2009/034791 A1 | 3/2009 |

OTHER PUBLICATIONS

Extended European Search Report for Application No. 08842280.3 dated Dec. 17, 2010.

* cited by examiner

Reference Example 2

Reference Example 3

PNEUMATIC TIRE

FIELD OF THE INVENTION

The present invention relates to a pneumatic tire capable of satisfying both noise performance and steering stability at high level while maintaining drainage performance and riding comfort.

BACKGROUND OF THE ART

Generally, to enhance the drainage performance of a tire, a capacity of a longitudinal groove extending in a circumferential direction of the tire provided on a tread portion thereof is increased. However, there is a problem that in such a longitudinal groove, air tube resonance is prone to be generated during running of a vehicle, and the noise performance is deteriorated. Further, there is a problem that the rigidity of the tread portion is lowered, and the steering stability is deteriorated.

The present applicant has already proposed a pneumatic tire in which a longitudinal groove straightly extending in a circumferential direction of the tire and slant grooves inclining with respect to the circumferential direction of the tire are combined, thereby suppressing the deterioration of the steering stability and the noise performance, thereby improving the drainage performance (see the following Patent Document 1).

Patent Document 1: Japanese Patent Application Laid-Open No. 2004-262312.

DISCLOSURE OF THE INVENTION

Problems to be Solved by the Invention

The drainage performance has been achieved to some extent by the above proposal. However, in view of quiet performance in a passenger room and high power tendency of a car engine of recent years, it is desired to further enhance the noise performance and the steering stability.

The present invention has been achieved in view of the circumstances, and based on a technique in which a slant groove and a thin longitudinal groove having particular shapes are combined with an intermediate land portion which is defined by a central longitudinal groove extending in a circumferential direction of the tire near the tire equator and a shoulder longitudinal groove extending in the circumferential direction of the tire on axially outer sides of the central longitudinal groove. It is a main object of the present invention to provide a pneumatic tire capable of satisfying both noise performance and steering stability at high level while maintaining drainage performance and riding comfort.

Means for Solving the Problem

According to the present invention, a pneumatic tire having a designed rotational direction, the tire comprising a tread portion being provided with:
one or two central longitudinal grooves extending in the circumferential direction of the tire on the tire equator or on each side of the tire equator;
shoulder longitudinal grooves each extending in the circumferential direction of the tire on each side of the above-mentioned central longitudinal groove; and
intermediate land portions each defined between the above-mentioned central longitudinal groove and the above-mentioned shoulder longitudinal groove, wherein
each of the above-mentioned intermediate land portion is provided with:
a thin groove straightly and continuously extending in the circumferential direction of the tire at a position away axially inside of 3 to 6% of the tread ground-contact width from the shoulder longitudinal groove;
intermediate slant grooves each extending from the above-mentioned thin groove toward the above-mentioned central longitudinal groove while inclining toward front-side in the rotational direction and having an inner end terminating without being connected to the above-mentioned central longitudinal groove; and
connection grooves each disposed axially inside of the above-mentioned thin groove and extending so as to connect between the adjacent intermediate slant grooves in the circumferential direction of the tire,
each of the above-mentioned connection groove has
a front-side end in the rotational direction connected with the above-mentioned inner end of the intermediate slant groove, and
a rear-side end in the rotational direction connected away axially outward of 3 to 10 mm from the inner end of the intermediate slant groove so that each connection groove inclines in the same direction as the above-mentioned intermediate slant groove with respect to the circumferential direction of the tire at an angle smaller than that of the intermediate slant groove.

Effect of the Invention

According to the pneumatic tire of the present invention, the tread portion includes the intermediate land portion defined by the central longitudinal groove and the shoulder longitudinal grooves extending in the circumferential direction. The intermediate land portion is provided with the thin groove which straightly and continuously extends in the tire circumferential direction at a position away from the shoulder longitudinal groove axially inward of the tire by a distance of from 3 to 6% of the tread ground-contact width. The thin groove functions as a circumferential groove for moderating rigidity of the intermediate land portion. Also the thin groove can prevent the riding comfort from being deteriorated and improve drainage performance. The thin groove can effectively drain water existing between the intermediate land portion and a road surface.

The intermediate land portion includes an intermediate slant groove which inclines and extends from the thin groove toward with respect to the central longitudinal groove the front-side in the rotational direction, and which has an inner end that terminates without being connected to the central longitudinal groove. Since the intermediate slant groove extends across the intermediate land portion subjected to a high ground-contact pressure, water existing between the intermediate land portion and the road surface can efficiently be drained axially outward of the tire according to the rotation of the tire. Therefore, the drainage performance can further be enhanced.

The intermediate land portion is provided with a connection grooves each of which is disposed axially inward of the tire from the thin groove and which connects the adjacent intermediate slant grooves in the tire circumferential direction. Such a connection groove is of use in moderating the rigidity of the intermediate land portion and enhancing the riding comfort. The front-side end in the rotational direction of the connection groove is connected to the inner end of the intermediate slant groove. On the other hand, the rear-side end in the rotational direction of the connection groove is connected to a position away from the inner end of the intermediate slant groove by a small distance of 3 to 10 mm axially outward of the tire. With this, the connection groove inclines in the same direction as the intermediate slant groove with respect to the tire circumferential direction, and inclines at a smaller angle than that of the intermediate slant groove. Such a combination of the connection grooves and the intermediate slant grooves improves in the intermediate land portion the drainage performance on the side of the tire equator, enhances the rigidity on the side of the thin groove, and improving the steering stability.

Air passing through the connection groove during rolling of the tire does not flow monotonously along the circumferential direction of the tire, but a part of the air is sequentially dispersed to the intermediate slant groove. Therefore, excitation of the air tube resonance caused by air passing through the connection groove is suppressed, and the noise performance is prevented from being deteriorated. The air dispersed and sent to the intermediate slant groove is discharged to the thin groove extending in the circumferential direction of the tire, and the flow of air in the thin groove is varied and the excitation of the air tube resonance can be suppressed.

According to the pneumatic tire of the present invention, it is possible to satisfy all of the drainage performance, the noise performance, and the riding comfort at high level.

EXPLANATION OF THE REFERENCE

Figure 1:
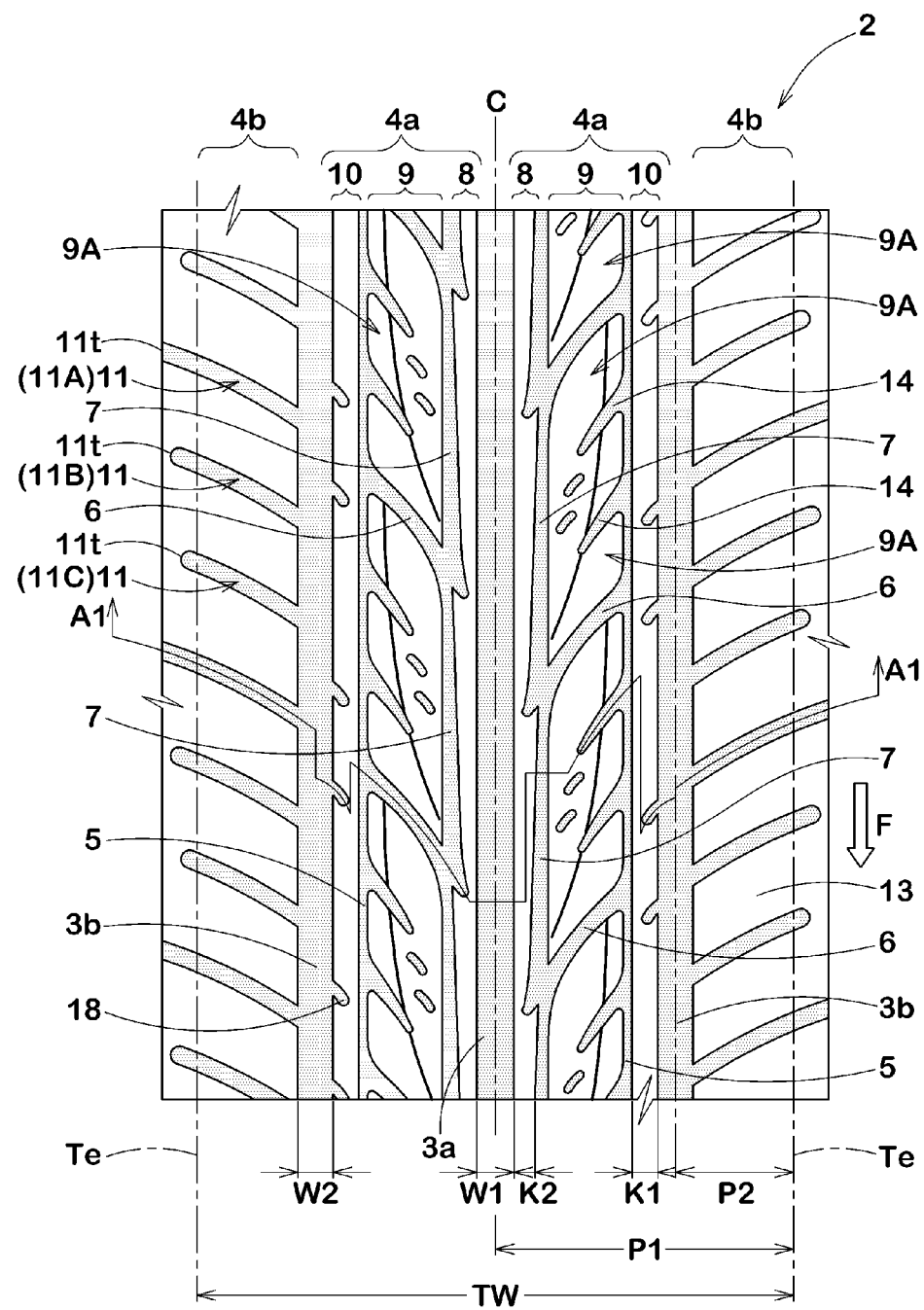
FIG. 1 A development view of a tread portion of a pneumatic tire of the present embodiment.

2 Tread portion
3a Central longitudinal groove
3b Shoulder longitudinal groove
4a Intermediate land portion
5 Thin groove
6 Intermediate slant groove
7 Connection groove
9A Intermediate block
11 Shoulder lateral groove
14 Intermediate auxiliary slant groove

BEST MODE FOR CARRYING OUT THE INVENTION

An embodiment of the present invention will be explained based on the drawings.

Figure 2:
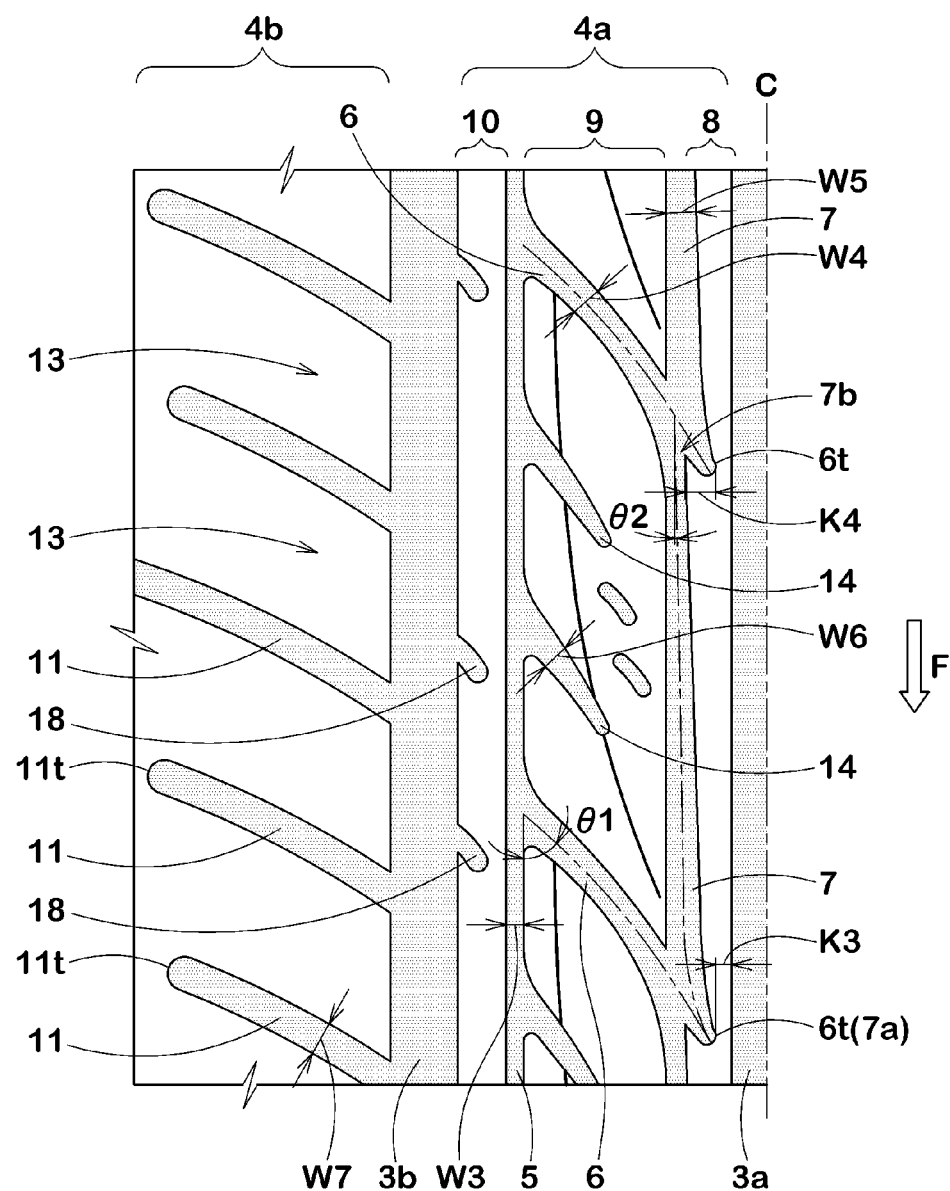
FIG. 2 A partial enlarged view of a left half thereof.
Figure 3:
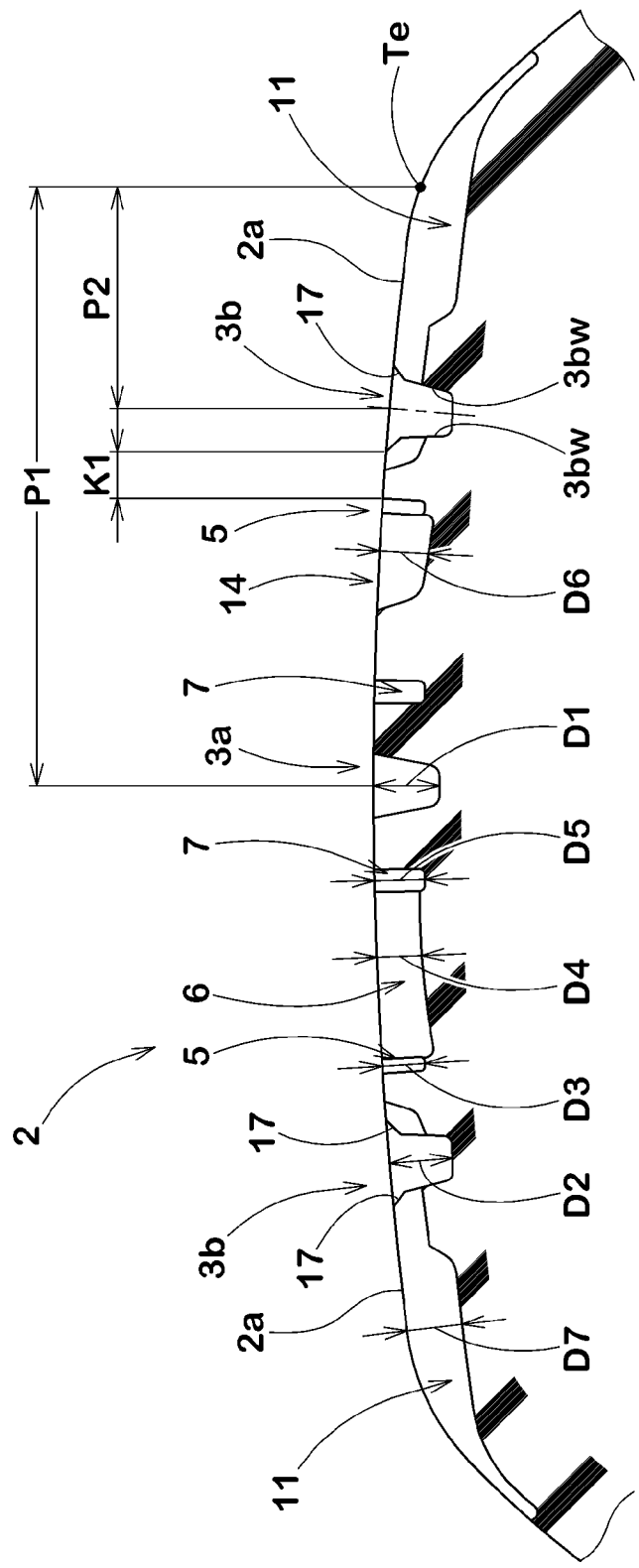
FIG. 3 A sectional view of a groove of a tread pattern taken along the line A1-A1.

FIG. 1 is a development view of a tread portion of a pneumatic tire (entire tire is not shown) of the present invention, FIG. 2 is a partial enlarged view of a left thereof, and FIG. 3 is a sectional view taken along the line A1-A1 in FIG. 1.

A pneumatic tire of the present embodiment is a passenger car tire, and has a so-called directional pattern in which a designed rotational direction F when the tire is mounted on the vehicle is defined. In the directional pattern of the present embodiment, the right side of the pattern portion and the left side of the pattern portion are substantially line-symmetric with respect to the tire equator C. Here, the phrase "substantially line-symmetric" must be understood so as to include an embodiment that has a difference caused by pitch variation or a phase deviation of the left and right side pattern portions in the tire circumferential direction.

The pneumatic tire of the present embodiment has a tread portion 2 provided with one central longitudinal groove 3a continuously extending in the circumferential direction of the tire on the tire equator C, and a pair of shoulder longitudinal grooves 3b and 3b each extending continuously in the circumferential direction of the tire on both sides of the central longitudinal groove 3a. With this, the tread portion 2 is formed with four land portions comprising a pair of intermediate land portions 4a defined between the central longitudinal groove 3a and the shoulder longitudinal groove 3b, and a pair of shoulder land portions 4b between the shoulder longitudinal groove 3b and the tread ground-contact edge Te.

The central longitudinal groove 3a comprises a straight groove straightly extending in the tire circumferential direction. Such a straight groove has a small drainage resistance, and exhibits high drainage performance when running straightly on wet road. A groove width w1 of the central longitudinal groove 3a is not especially limited, but if it is too small, sufficient drainage performance can not be obtained, and if the groove width w1 is too wide, the noise performance tends to deteriorate. From the viewpoint of such reasons, the groove width w1 of the central longitudinal groove 3a is preferably not less than 2.5% of the tread ground-contact width TW, more preferably not less than 3.0%, and preferably not more than 5.5%, and more preferably not more than 5.0%. The groove width is an opening width of an outer surface of the tread portion 2 as measured at right angles with a longitudinal direction of the groove.

Here, the "tread ground-contact width TW" is an axial distance between the tread ground-contact edges Te, Te measured in a condition of the tire in which the tire is mounted on a standard wheel rim and inflate to a standard pressure and loaded with standard load.

The "standard rim" is a wheel rim officially approved for the tire by standard organization, i.e. the "standard rim" specified in JATMA, the "Measuring Rim" in ETRTO, and the "Design Rim" in TRA or the like.

The "standard pressure" is a air pressure officially approved for the tire by standard organization, i.e. the "maximum air pressure" in JATMA, the "Inflation Pressure" in ETRTO, and the maximum pressure given in the "Tire Load Limits at various Cold Inflation Pressures" table in TRA or the like. In case of passenger car tires, however, 180 kPa is used as the standard pressure.

The "standard load" is a tire load officially approved for the tire by standard organization, i.e. the "maximum load capacity" in JATMA, the "Load Capacity" in ETRTO, and the maximum value given in the above-mentioned table in TRA or the like. In case of passenger car tires, however, 88% of the maximum load is used as the standard load.

It is preferable that the central longitudinal groove 3a is provided at a position where a distance P1 from the tread ground-contact edge Te to the centerline of the central longitudinal groove 3a in the axial direction of the tire is 50% of the tread ground-contact width TW. With this, drainage performance on the tire equator C is enhanced. However, a pair of central longitudinal grooves 3a and 3a, not shown, may be provided on both sides of the tire equator C. In this case, it is preferable that the above-mentioned distance P1 above is 42 to 46% of the tread ground-contact width TW. If the distance P1 exceeds 46% of the tread ground-contact width TW, the rigidity of the land portion between the central longitudinal grooves 3a is prone to be largely deteriorated, and if the distance P1 is less than 42%, the drainage effect near the tire equator C tends to deteriorate.

The shoulder longitudinal groove 3b is also a straight groove extending straightly in the tire circumferential direction like the central longitudinal groove 3a so that high drainage performance can be exhibited during straight running. A groove width w2 of the shoulder longitudinal groove 3b is not especially limited, but in order to enhance the drainage performance and the noise performance thereof, it is preferable that the groove width w2 is not less than 3.5% of the tread ground-contact width TW, more preferably not less than 4.0%, and preferably not more than 6.5%, and more preferably not more than 6.0%. In a tire having a high ground-contact pressure of the shoulder portion due to influence of profile or the like of the tread portion 2, the groove width w2 of the shoulder longitudinal groove 3b may be set greater than the groove width w1 of the central longitudinal groove 3a to improve the drainage performance.

In order to enhance the drainage performance and the noise performance with excellent balance, the groove depths D1 and D2 of the central longitudinal groove 3a and the shoulder longitudinal groove 3b (shown in FIG. 3) are preferably not less than 6 mm, more preferably not less than 7 mm, and preferably not more than 10 mm, and more preferably not more than 9 mm.

The shoulder longitudinal groove 3b is preferably provided at a position where an axial distance P2 between the centerline of the shoulder longitudinal groove 3b and the tread ground-contact edge Te is 17 to 25% of the tread ground-contact width TW. With this, the ground-contact patch of the tread portion 2 is substantially equally divided into four by the central longitudinal groove 3a and the shoulder longitudinal grooves 3b, the rigidity balance of the tread portion 2 is maintained excellently, and the steering stability can be enhanced.

As shown in FIG. 3, a corner portion between a groove wall 3bw of the shoulder longitudinal groove 3b and a ground-contact surface 2a of the tread portion 2 are preferably chamfered by a slant 17. Especially, the width of the axially outward slant 17 of the tire (i.e., slant on the side of the shoulder land portion 4b) is set larger. This is of use in preventing stress concentration on the shoulder land portion 4b at the time of high speed running, and in suppressing uneven wear.

The intermediate land portion 4a is provided with a thin groove 5 extending in the tire circumferential direction near the shoulder longitudinal groove 3b, intermediate slant grooves 6 inclining and extending from the thin groove 5 toward the central longitudinal groove 3a, connection grooves 7 located axially inward of the thin groove 5 and connecting the adjacent intermediate slant grooves 6 and 6 in the tire circumferential direction, and auxiliary slant grooves 14 provided between the adjacent intermediate slant grooves 6 and 6 in the tire circumferential direction. By these grooves 5, 6, 7, and 14, the intermediate land portion 4a is divided into an inner rib 8 continuously extending in the tire circumferential direction between the connection groove 7 and the central longitudinal groove 3a, an outer rib 10 continuously extending in the tire circumferential direction between the shoulder longitudinal groove 3b and the thin groove 5, and a intermediate block row 9 which are provided between the inner rib 8 and the outer rib 10 and in which intermediate blocks 9A defined by intermediate slant grooves 6 and 6 are arranged in the tire circumferential direction.

The thin groove 5 straightly and continuously extends in the tire circumferential direction at a position away from the shoulder longitudinal groove 3b inward of an axial direction of the tire by a distance K1 (shown in FIG. 1) of from 3 to 6% of the tread ground-contact width TW. Such a circumferentially extending thin groove 5 moderates the rigidity of the intermediate land portion 4a and enhances the riding comfort. The thin groove 5 also functions as a circumferential direction groove with excellent drainage performance, and effectively drains water existing between the intermediate land portion 4a and a road surface. Further, since the outer rib 10 formed between the thin groove 5 and the shoulder longitudinal groove 3b extends continuously in the tire circumferential direction, the thin groove 5 is of use in enhancing the straight running stability at the time of high speed running. The outer rib 10 may appropriately be provided with a rigidity adjusting recess 18.

Here, if the distance K1 (i.e., width of the outer rib 10) becomes less than 3% of the tread ground-contact width TW, lateral rigidity of the outer rib 10 is largely deteriorated, and its rubber tends to be chipped or unequally worn. If the distance K1 exceeds 6% of the tread ground-contact width TW on the other hand, the width of the intermediate blocks 9A in the tire axial direction becomes small, and the steering stability tends to deteriorate. From such a viewpoint, the distance K1 is preferably not less than 4% of the tread ground-contact width TW, and more preferably not more than 5%.

Moreover, if the groove width w3 and a groove depth D3 of the thin groove 5 are too small, the ride comfort and drainage performance tend to deteriorate, and if they are too large, the ground-contact surface and the rigidity of the intermediate land portion 4a are reduced, and dry grip performance tends to deteriorate. From such a viewpoint, the groove width w3 of the thin groove 5 is preferably not less than 0.5% of the tread ground-contact width TW, more preferably not less than 1.0%, and preferably not more than 2.5% and more preferably not more than 2.0%. Similarly, the groove depth D3 (shown in FIG. 3) of the thin groove 5 is preferably not less than 55% of the groove depth D2 of shoulder longitudinal groove 3b, more preferably not less than 60%, and more preferably not more than 75%, and more preferably not more than 70%.

As shown in FIG. 2 with the enlarged scale, the intermediate slant groove 6 extends from the thin groove 5 toward the central longitudinal groove 3a while inclining towards the front-side in the rotational. The intermediate slant groove 6 has an inner end 6t in the tire axial direction. The axially inner end 6t terminates without being connected to the central longitudinal groove 3a. Since the intermediate slant groove 6 extends across the intermediate land portion 4a subjected to a high ground-contact pressure, the intermediate slant groove 6 efficiently drains water existing between the intermediate land portion 4a and a road surface into the shoulder longitudinal groove 3b on axially outer side according to the rotation of the tire. Thus, this structure can enhance the drainage performance of the tire.

Also, since the axially inner end 6t of the intermediate slant groove 6 is provided without being connected to the central longitudinal groove 3a, it is possible to prevent the rigidity of the axially inner side of the intermediate land portion 4a from being deteriorated, and to secure the steering stability. However, if the distance K3 between the axially inner end 6t of the intermediate slant groove 6 and the central longitudinal groove 3a is too large, the drainage performance on the side of the tire equator C tends to deteriorate. If the distance K3 above is too small, the steering stability on a dry road surface tends to deteriorate. From such a viewpoint, the distance K3 is preferably not less than 3 mm, more preferably not less than 4 mm, and preferably not more than 6 mm, and more preferably not more than 5 mm. It is preferable that a groove width W4 of the intermediate slant groove 6 is 1 to 3% of the tread ground-contact width TW, and a groove depth D4 (shown in FIG. 3) is 70 to 85% of the groove depth D2 of the shoulder longitudinal groove 3b.

In the present embodiment, the intermediate slant groove 6 is smoothly curved and extends from the thin groove 5 toward the inner end 6t while reducing an angle θ1 (theta 1) on the side of an acute angle with respect to the tire circumferential direction, but the intermediate slant groove 6 may extend constantly. In order to secure the lateral rigidity of the intermediate blocks 9A and exhibit sufficient set performance, the angle θ1 (theta 1) of the intermediate slant groove 6 with respect to the tire circumferential direction is preferably not less than 35 degrees, more preferably not less than 40 degrees, and preferably not more than 55 degrees and more preferably not more than 50 degrees. The angle of the groove is an angle around the groove centerline with respect to the tire circumferential direction, however, when the groove centerline is a curve, the groove angle is defined as an angle formed between a tangent thereof with respect to the tire circumferential direction.

It is preferable that not less than 20 and not more than 30 intermediate slant grooves 6 are disposed comparatively sparsely around one circuit of the tire in each intermediate land portion 4a. With this, the intermediate blocks 9A becomes longitudinally large in the tire circumferential direction, and this is of use in securing excellent straight-running stability and wear resistance. When the number of intermediate slant grooves 6 above is less than 20, the drainage performance tends to deteriorate, and if the number exceeds 30, the circumferential rigidity of the intermediate blocks 9A tends to deteriorate and the dry grip performance is also deteriorated.

The connection groove 7 is disposed axially more inward of the tire than the thin groove 5, and connects the adjacent intermediate slant grooves 6 in the tire circumferential direction. Such a connection groove 7 is of use in moderating the rigidity of the intermediate land portion 4a and enhancing the riding comfort. The front-side end 7a in the rotational direction of the connection groove 7 is connected to the axially inner end 6t of the intermediate slant groove 6. On the other hand, the rear-side end 7b in the rotational direction is connected to the intermediate slant groove 6 at a location away from its inner end 6t axially outward of the tire by a small distance K4 of 3 to 10 mm. With this, the connection groove 7 inclines in the same direction as the intermediate slant groove 6 with respect to the circumferential direction of the tire at a smaller angle θ2 (theta 2) than that of the intermediate slant groove 6. According to such a combination of the connection groove 7 and the intermediate slant groove 6, the drainage performance is further enhanced by the connection groove 7 which inclines with respect to the circumferential direction of the tire at the small angle θ2 (theta 2) on the ill-drainage side of the tire equator C. However, on the side of the shoulder longitudinal groove 3b where large lateral force is generated at the time of cornering of the vehicle, the intermediate slant groove 6 which extends at relatively large angle θ1 (theta 1) enhances lateral rigidity of the intermediate land portion 4a.

The connection groove 7 is continuously formed in the tire circumferential direction through the intermediate slant groove 6. Therefore, the drainage performance near the tire equator C can largely be enhanced. Air which passes through the connection groove 7 during running on dry roads does not flow monotonously along the tire circumferential direction, but a part of the air is dispersed to the intermediate slant groove 6 in the rear-side end 7b. Therefore, excitation of the air tube resonance caused by air passing through the connection groove 7 is suppressed, and the noise performance is prevented from being deteriorated. Air dispersed and sent to the intermediate slant groove 6 is discharged to the thin groove extending in the tire circumferential direction, and the flow of air in the thin groove 5 is varied and the excitation of the air tube resonance can be suppressed.

Here, if the distance K4 is less than 3 mm, the dispersion effect of air passing through the connection groove 7 is deteriorated, and the noise performance is not sufficiently enhanced. If the distance K4 exceeds 10 mm, the angle θ2 (theta 2) of the connection groove 7 tends to increase and the drainage performance is not sufficiently enhanced. From such a viewpoint, the distance K4 is preferably not less than 5 mm and not more than 8 mm. Similarly, the angle θ2 (theta 2) of the connection groove 7 with respect to the tire circumferential direction is preferably not less than 1 degree and not less than 2 degrees. It is preferable that a groove width w5 of the connection groove 7 is about 1 to 3% of the tread ground-contact width TW, and a groove depth D5 is 70 to 80% of the groove depth D2 of the shoulder longitudinal groove 3b.

Figure 4:
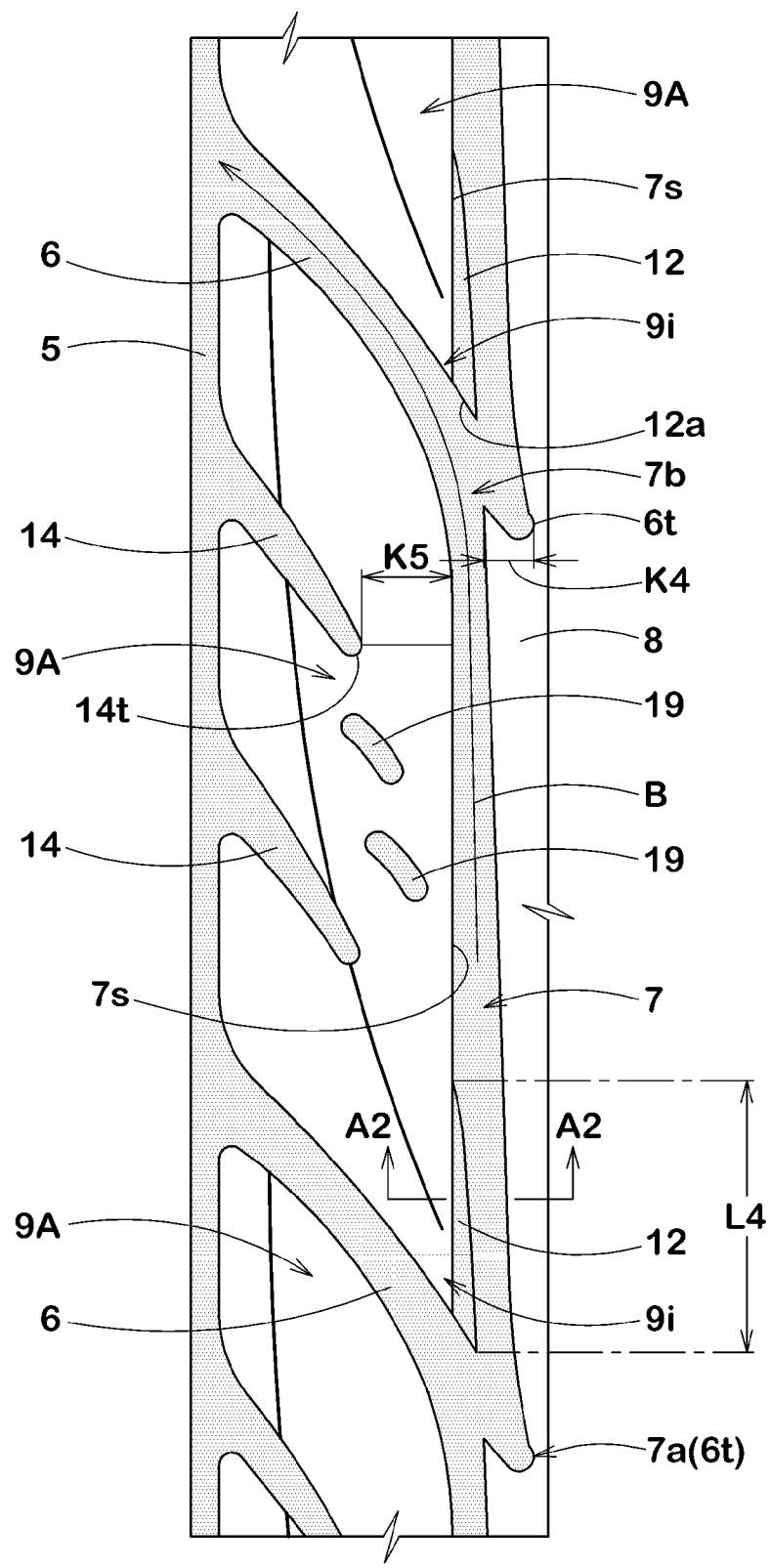
FIG. 4 An enlarged view of the connection groove and the intermediate slant groove.
Figure 5:
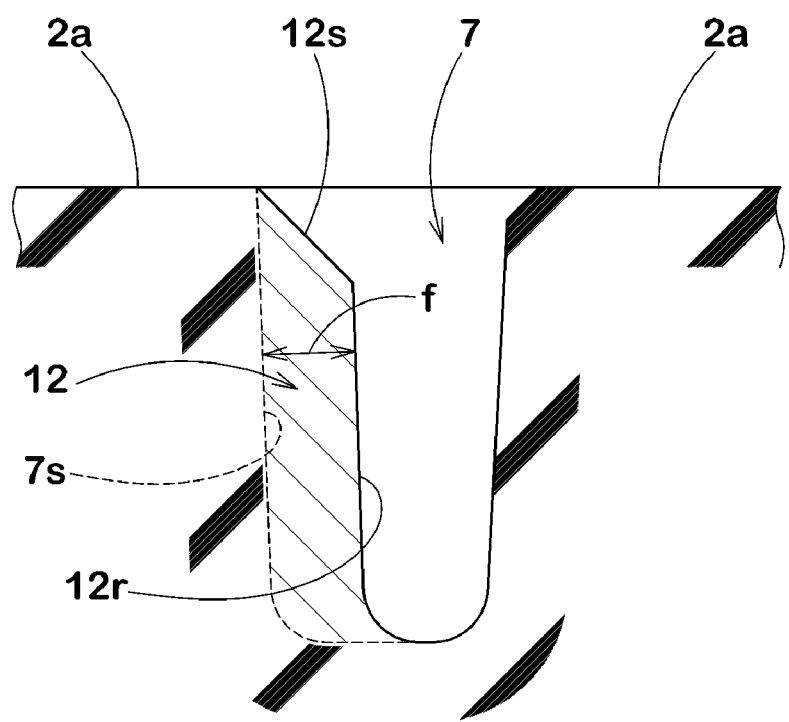
FIG. 5 A sectional view of a wall surface protrusion taken along the line A2-A2.

As shown in FIG. 4 and FIG. 5, which is a sectional view thereof taken along the line A2-A2, the axially outside groove wall 7s of each connection groove 7 is preferably provided with a protrusion 12. The protrusion 12 protrudes toward the center side of the groove partially from the groove wall 7s, and is preferably provided at the length L4 of at least 10 mm in the tire circumferential direction on the side of the front-side end 7a. More specifically, the protrusion 12 of the present embodiment extends toward the rotational direction beyond a tip end 9i of the intermediate blocks 9A formed into the acute angle shape and is located on the first ground-contacting side according to the rotational direction. The protrusion 12 includes a tapered surface 12s which is inclined from the ground-contact surface 2a inward in the tire radial direction, and a protruding wall surface 12r extending from the tapered surface 12s to a groove bottom radially inward of the tire.

As shown in FIG. 4, such a protrusion 12 smoothly distributes water on a road surface near the tire equator C guided by the connection groove 7 to the intermediate slant groove 6 as shown an arrow B and efficiently discharges water axially outward of the tire, and enhances the drainage performance. The protrusion 12 also guides air passing through the connection groove 7 into the intermediate slant groove 6 efficiently, changes air in the thin groove 5 effectively, and further suppresses the excitation of the air tube resonance. The protrusion 12 also enhances the rigidity near the tip end 9i of the intermediate block 9A where the intermediate slant groove 6 and the connection groove 7 intersect thereby deteriorating the rigidity, and is of use in enhancing the steering stability. To effectively exhibit such effects, a protruding width (f) of the wall surface protrusion 12 is preferably set about 1 to 2 mm.

Like the outer rib 10, the inner rib 8 enhances the straight running stability when high speed running. The inner rib 8 extends in the tire circumferential direction such that the width K2 thereof in the tire axial direction is repeatedly increased and reduced by the slant of the connection groove 7. Such an inner rib 8 is of use in dispersing the noise frequency generated by contact between the tire and a road surface during running.

The intermediate block 9A has a length in the tire circumferential direction greater than a width thereof in the tire axial direction. Each intermediate block 9A is provided with a plurality of (two, in this embodiment) auxiliary slant grooves 14 extending substantially in parallel to the intermediate slant groove 6. The intermediate auxiliary slant groove 14 extends toward the front-side in the rotational direction, that is to say the same direction as that of the intermediate slant groove 6, during approaching the connection groove 7. The auxiliary slant groove 14 terminates without being connected to the connection groove 7. With this, the intermediate block 9A which is long in the tire circumferential direction is formed in to substantially comb-like shape, and this can prevent the deterioration of the drainage performance and wearing performance.

If an axially distance K5 between the connection groove 7 and an axially inner end 14t of the auxiliary slant groove 14 becomes small, the rigidity of this portion is largely lowered and the rubber becomes unequally worn or chipped. In contrast, if the distance K5 becomes large, the improving effects of the riding comfort and wear resistance and the drainage performance tend to deteriorate. From such a viewpoint, the distance K5 is preferably set not less than 5 mm, more preferably not less than 6 mm, more preferably not more than 10 mm, and more preferably not more than 9 mm. It is preferable that a groove width w6 of the auxiliary slant groove 14 is from 1 to 3% of the tread ground-contact width TW, and a groove depth D6 is about 80 to 100% of the groove depth D4 of the intermediate slant groove 6. The intermediate block 9A may be provided with a radiating recess 19.

A plurality of shoulder lateral grooves 11 extending from the shoulder longitudinal groove 3b to the tread ground-contact edge Te are disposed on the shoulder land portion 4b. Each shoulder-lateral groove 11 inclines in the same direction as the intermediate slant groove 6, and extends from the shoulder longitudinal groove 3b toward the rear-side in the rotational direction. The shoulder lateral groove 11 extends at least to the tread ground-contact edge Te. With this, the shoulder land portion 4b is formed as a block row in which a plurality of shoulder blocks 13 are arranged in the tire circumferential direction. The shoulder land portion 4b can guide the water and air in part along the shoulder longitudinal groove 3 and can discharge them from the tread ground-contact edge Te.

When the vehicle turns, even an outer region of the tread ground-contact edge Te of the tire comes into contact with the ground. Therefore, the axially outer end 11t of the shoulder lateral groove 11 is preferably beyond the tread ground-contact edge Te. With this, the drainage performance when cornering is enhanced. If each end 11t of the shoulder lateral groove 11 is provided at the same position in the tire axial direction, noise frequencies at the time of cornering are superposed on each other, and large pumping noise and the like are prone to be generated. Therefore, in order to maintain the hydro performance at the time of cornering and to improve the noise performance, a plurality of kinds, preferably three or more kinds of shoulder lateral grooves 11 having different positions of the outer ends 11t in the tire axial direction are provided (in this embodiment, there are three kinds of shoulder lateral grooves 11A, 11B, and 11C).

A groove width w7 and a groove depth D7 of the shoulder lateral groove 11 are not especially limited, but it is preferable that the groove width w7 is not less than 0.5% of the tread ground-contact width TW, more preferably not less than 1.0%, and more preferably not more than 3.5%, and more preferably not more than 3.0%. Similarly, the groove depth D7 (shown in FIG. 3) of the shoulder lateral groove 11 is preferably about 70 to 90% of the groove depth D2 of the shoulder longitudinal groove 3b.

According to the pneumatic tire of the embodiment, a land ratio of the tread portion 2 is preferably in a range of from 68 to 72%. If the land ratio is over 72%, the groove area is apt to decrease, thereby not improving a sufficient drainage performance. If the land ration is less than 68%, the steering stability is apt to deteriorate. The land ratio is a ratio of an area of a ground-contact surface occupied in the entire area (including the groove area) of the ground-contact surface under the condition with the standard rim, the standard internal pressure, and the standard load.

Although the especially preferable embodiment of the present invention has been described in detail, the invention is not limited to the illustrated embodiment, and the invention can be deformed into various modes and can be carried out.

EMBODIMENT

Figure 6:
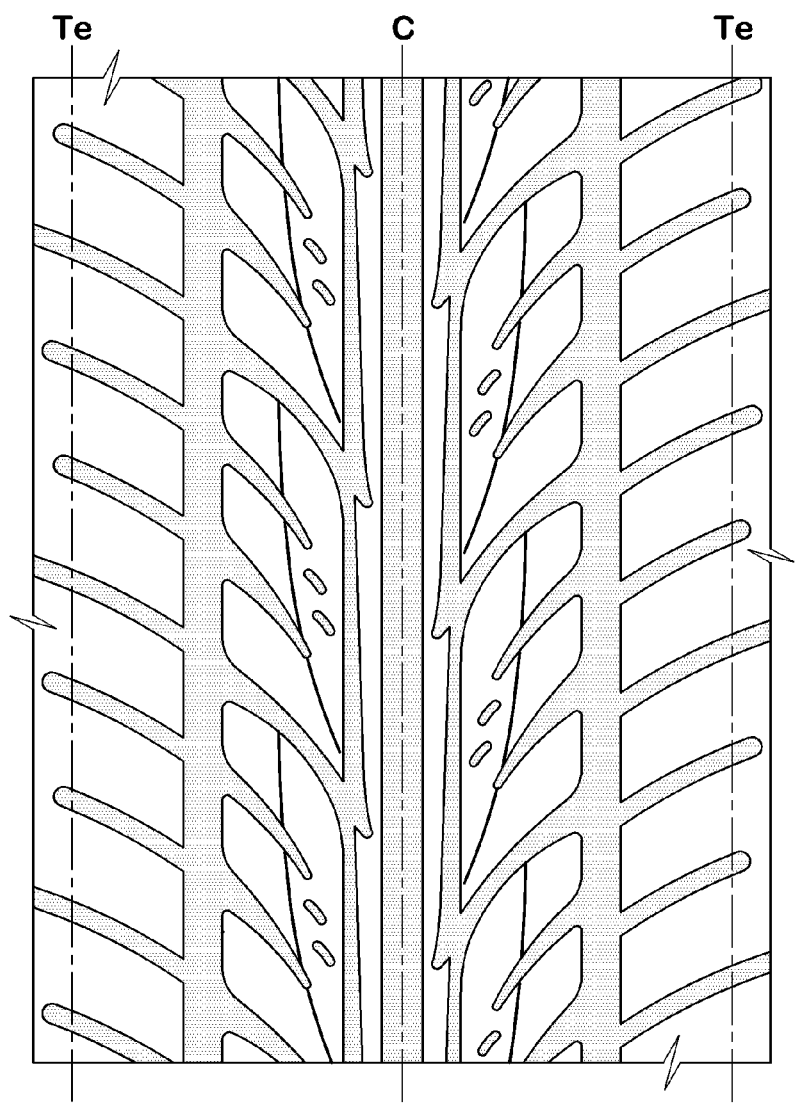
FIG. 6 A development view of a tread portion of Reference Example 1.

Radial tires for a passenger car with a size 195/65R15 were prototyped under the specification shown in Table 1, the drainage performance, the riding comfort and the noise performance of each tire were tested. Tires of examples have the tread pattern shown in FIG. 1. As shown in FIG. 6, in the tire of Reference Example 1, the intermediate land portion is not provided with a thin groove. In the tire of Reference Example 2, the intermediate land portion is not provided with a connection groove shown. In the tire of Reference Example 3, both ends of the connection groove are connected to the axially inner ends of the intermediate slant groove shown. In Reference Example 2, the number of intermediate slant grooves arranged in the tire circumferential direction was increased so that the land ratios become the same to the other Examples. Common specifications were as follows:

Tread ground-contact width TW: 153 (mm)
Groove width (W1/TW) of central longitudinal groove: 4%
Groove depth D1 of central longitudinal groove: 7.8 (mm)
Groove width (W2/TW) of shoulder longitudinal groove: 5%
Groove depth D2 of shoulder longitudinal groove: 7.8 (mm)

Test methods are as follows:
Drainage Performance:
A 2000 cm$^3$ front-engine front-drive passenger car provided on all the four wheels with test tires (tire pressure 200 kPa, rim size 6.0JJ×15) was run along a 100 meter radius circle on an asphalt road partially provided with a 5 mm-depth, 20 m-long water pool, and the lateral acceleration (lateral G) during running in the water pool was measured at the front wheels, gradually increasing the speed entering into the water pool, to obtain the average lateral acceleration for the speed range of from 50 to 80 km/h (lateral hydroplaning test). The results are indicated by an index based on Reference Example 1 being 100, wherein the larger is better.

Steering Stability:
The above-mentioned test car was run on a dry asphalt road in a test course, and the test driver evaluated steering stability based on the cornering response, rigidity, grip and the like. The test results are indicated by ranks based on Reference Example is being 100. The higher the rank, the better the performance.

Ride Comfort:
Similarly to the above-mentioned test, a driver's feeling test regarding ruggedness impression, push up, and dumping was carried out on a stepped dry asphalt road surface, a stone paved road surface, and a pebble scattered road surface. The test results are indicated by ranks based on Reference Example 1 being 100. The higher the rank, the better the ride comfort.

Noise Performance:
In the noise performance test, the mentioned-above passenger car was run on a smooth asphalt road at a speed of 60 km/hr, and the overall noise level dB(A) was measured in the car at a fixed position close to the inside ear of the driver. The test results are indicated by an index based on Reference Example 1 being 100. The larger is better.

[Table 1]

TABLE 1

Figure 7:
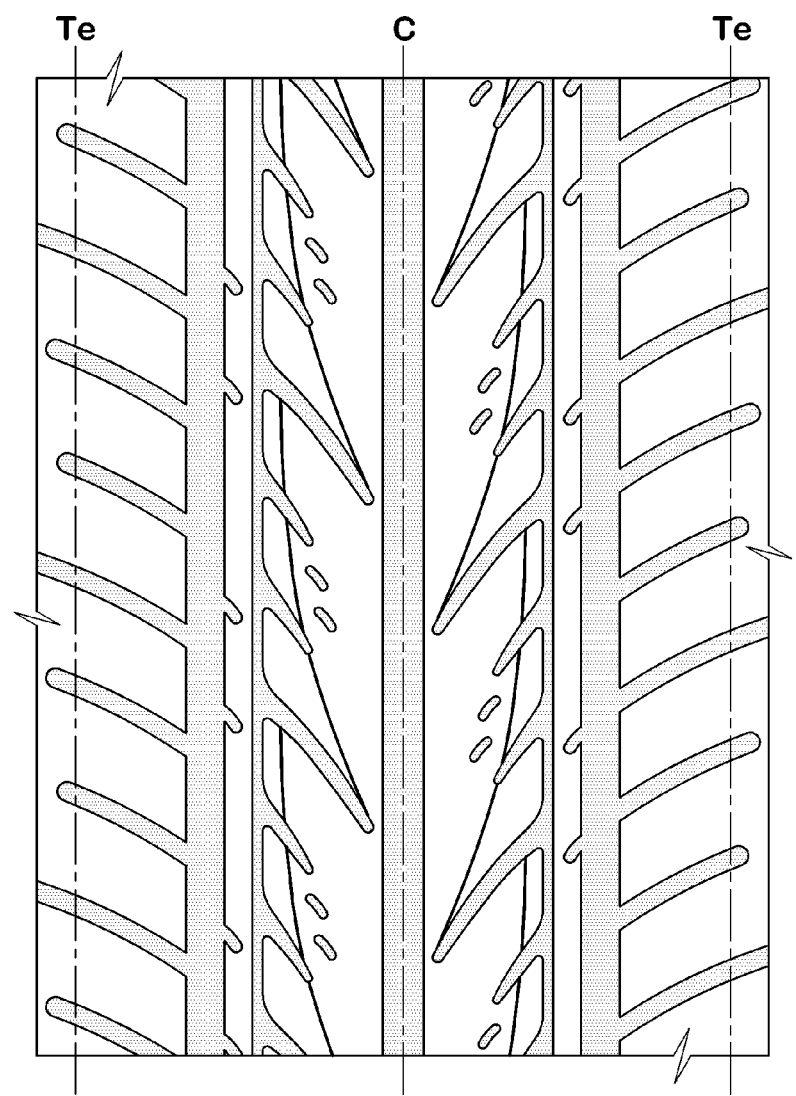
FIG. 7 A development view of a tread portion of Reference Example 2.
Figure 8:
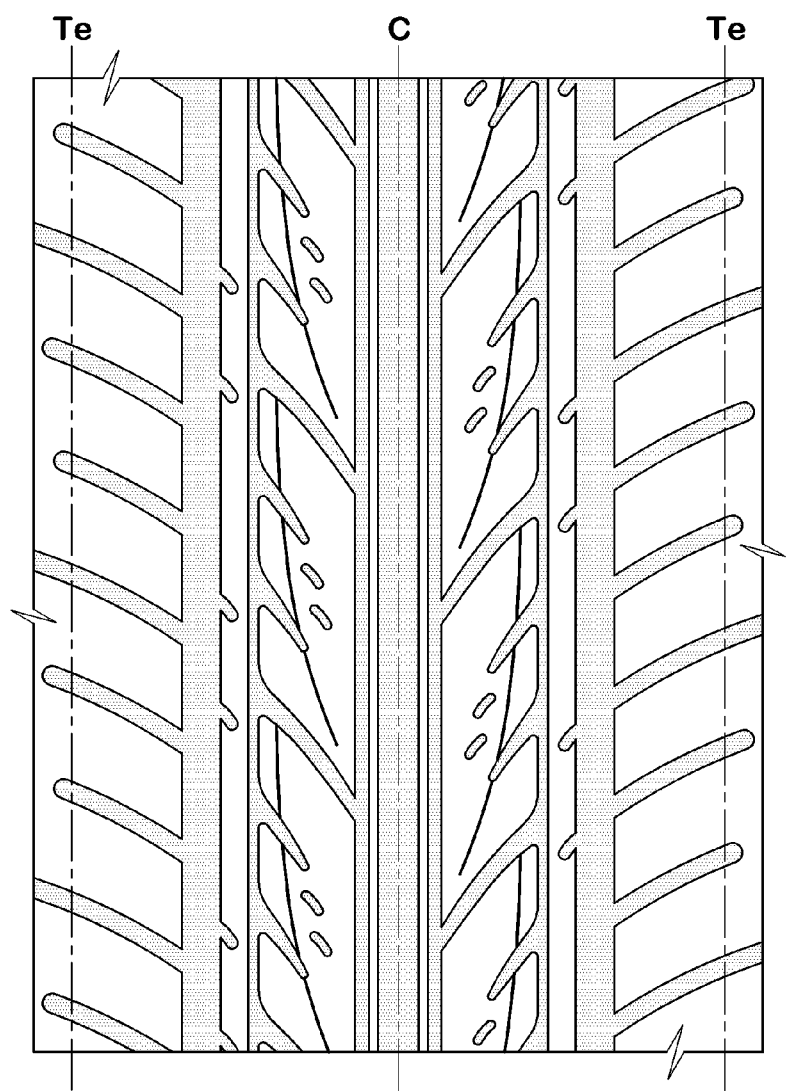
FIG. 8 A development view of a tread portion of Reference Example 3.

|  | Ref. Ex. 1 | Ref. Ex. 2 | Ref. Ex. 3 | Ex. 1 | Ex. 2 | Ex. 3 | Ex. 4 | Ex. 5 |
|---|---|---|---|---|---|---|---|---|
| Tread pattern | FIG. 6 | FIG. 7 | FIG. 8 | FIG. 1 | FIG. 1 | FIG. 1 | FIG. 1 | FIG. 1 |
| Land ratio (%) | 70 | 70 | 70 | 70 | 70 | 70 | 70 | 70 |
| Position (P1/TW) of central longitudinal groove | 50 | 50 | 50 | 50 | 50 | 50 | 50 | 50 |
| Position (P2/TW) of shoulder longitudinal groove | 21 | 21 | 21 | 21 | 21 | 15 | 21 | 21 |
| Thin groove | Absence | Presence | Presence | Presence | Presence | Presence | Presence | Presence |
| Distance (K1/TW) between thin groove and shoulder longitudinal groove (%) | — | 4.7 | 4.7 | 4.7 | 4.7 | 4.7 | 4.7 | 4.7 |
| Groove width (W3/TW) of thin groove (%) | — | 1.1 | 1.1 | 1.1 | 1.1 | 1.1 | 3.0 | 1.1 |
| Groove depth D3 of thin groove (mm) | — | 5.0 | 5.0 | 5.0 | 5.0 | 5.0 | 5.0 | 5.0 |
| Groove width of intermediate slant groove (W4/TW) | — | 2.2 | 2.2 | 2.2 | 1.8 | 2.2 | 2.2 | 2.2 |
| Groove depth D4 of intermediate slant groove (mm) | — | 6.1 | 6.1 | 6.1 | 6.1 | 6.1 | 6.1 | 6.1 |
| Angle θ1 of intermediate slant groove (deg.) | 46 | 46 | 46 | 46 | 46 | 46 | 46 | 46 |
| Number of intermediate slant grooves in tire circumferential direction | 26 | 30 | 26 | 26 | 30 | 26 | 26 | 26 |
| Connection groove | Presence | Absence | Presence | Presence | Presence | Presence | Presence | Presence |
| Distance K5 (mm) | 7.9 | — | 7.9 | 7.9 | 7.9 | 7.9 | 7.9 | 7.9 |
| Distance K3 (mm) | 4.3 | 4.3 | 4.3 | 4.3 | 4.3 | 4.3 | 4.3 | 2.0 |
| Distance K4 (mm) | 5.1 | — | — | 5.1 | 5.1 | 5.1 | 5.1 | 5.1 |
| Groove width of connection groove (W5/TW) (%) | 1.9 | — | 1.9 | 1.9 | 1.9 | 1.9 | 1.9 | 1.9 |
| Groove depth D5 of connection groove (mm) | 5.7 | — | 5.7 | 5.7 | 5.7 | 5.7 | 5.7 | 5.7 |
| Angle θ2 (deg.) | 1.7 | — | 0 | 1.7 | 1.7 | 1.7 | 1.7 | 1.7 |
| Groove wall protrusion | Presence | Presence | Presence | Presence | Presence | Presence | Presence | Presence |
| Length L4 of groove wall protrusion (mm) | 24.9 | 24.9 | 24.9 | 24.9 | 24.9 | 24.9 | 24.9 | 24.9 |
| Groove wall protrusion width "f" (mm) | 1.9 | 1.9 | 1.9 | 1.9 | 1.9 | 1.9 | 1.9 | 1.9 |
| Auxiliary slant groove | Presence | Presence | Presence | Presence | Presence | Presence | Presence | Presence |
| Groove width (W6/TW) of intermediate auxiliary slant groove (%) | 2.0 | 2.0 | 2.0 | 2.0 | 1.6 | 2.0 | 2.0 | 2.0 |
| Groove depth D7 of intermediate auxiliary slant groove (mm) | 5.9 | 5.9 | 5.9 | 5.9 | 5.9 | 5.9 | 5.9 | 5.9 |
| Number of intermediate auxiliary slant groove per one intermediate block | 2 | 2 | 2 | 2 | 2 | 2 | 2 | 2 |
| Number of kinds of shoulder lateral grooves | 3 | 3 | 3 | 3 | 3 | 3 | 3 | 3 |
| Groove width (W7/TW) of shoulder lateral groove (%) | 2.2 | 2.2 | 2.2 | 2.2 | 2.2 | 2.2 | 2.2 | 2.2 |
| Groove depth D6 of shoulder lateral groove (mm) | 6.2 | 6.2 | 6.2 | 6.2 | 6.2 | 6.2 | 6.2 | 6.2 |
| Drainage performance (index) | 100 | 95 | 98 | 98 | 98 | 97 | 99 | 98 |
| Steering stability (Ranks) | 100 | 95 | 100 | 105 | 98 | 100 | 98 | 98 |
| Ride comfort (Ranks) | 100 | 95 | 100 | 103 | 105 | 103 | 100 | 103 |
| Noise performance (index) | 100 | 105 | 102 | 103 | 103 | 103 | 102 | 103 |

As a result of the test, it could confirmed that in the pneumatic tires of Examples, drainage performance and riding comfort were maintained, and noise performance and steering stability were highly enhanced.

The invention claimed is:

1. A pneumatic tire having a designed rotational direction, the tire comprising a tread portion being provided with:
   one or two central longitudinal grooves extending in the circumferential direction of the tire on the tire equator or on each side of the tire equator;
   shoulder longitudinal grooves each extending in the circumferential direction of the tire on each side of said central longitudinal groove; and
   intermediate land portions each defined between said central longitudinal groove and said shoulder longitudinal groove, wherein
   each of said intermediate land portions is provided with:
   a thin groove straightly and continuously extending in the circumferential direction of the tire at a position away axially inside of 3 to 6% of the tread ground-contact width from said shoulder longitudinal groove, and a groove width W3 of said thin groove is in a range from 0.5 to 2.5% of the tread ground-contact width TW;
   intermediate slant grooves each extending from said thin groove toward said central longitudinal groove while inclining toward a front-side in said rotational direction and having an axially inner end terminating without being connected to said central longitudinal groove; and connection grooves each disposed axially inside of said thin groove and extending so as to connect between the adjacent intermediate slant grooves in the circumferential direction of the tire, each of said connection grooves having a front-side end in the rotational direction connected with said inner end of the intermediate slant groove, and a rear-side end in the rotational direction connected away axially outward of 3 to 10 mm from the inner end of the intermediate slant groove so that each connection groove inclines in the same direction as said intermediate slant groove with respect to the circumferential direction of the tire at an angle smaller than that of the intermediate slant groove, wherein said intermediate land portion comprises:

an outer rib continuously extending in the circumferential direction of the tire between said shoulder longitudinal groove and said thin groove;

an inner rib continuously extending in the circumferential direction of the tire between said connection groove and said central longitudinal groove; and an intermediate block row in which intermediate blocks defined by said intermediate slant groove are arranged therebetween in the circumferential direction of the tire.

2. The pneumatic tire according to claim 1, wherein said intermediate land portion is provided between the adjacent intermediate slant grooves in the circumferential direction of the tire with at least one intermediate auxiliary slant groove extending from said thin groove toward said connection groove while inclining toward the front-side in the rotational direction and terminating without being connected to the connection groove.

3. The pneumatic tire according to claim 1, wherein a wall protrusion protruding into said connection groove and having a length of at least 10 mm in the circumferential direction of the tire is provided on an axially outside groove wall of said connection groove on a side of said front-side edge.

4. The pneumatic tire according to claim 1, wherein said tread portion is provided with a shoulder land portion between said shoulder longitudinal groove and a tread ground-contact edge, the shoulder land portion is provided with shoulder lateral grooves each extending from said shoulder longitudinal groove toward said tread ground-contact edge in said circumferential direction, and the shoulder lateral grooves include a plurality of kinds of shoulder lateral grooves whose outer end positions in the axial direction of the tire are different from each other.

5. The pneumatic tire according to claim 1, wherein a groove width W1 of said central longitudinal groove is in a range of from 2.5 to 5.5% the tread ground-contact width TW, and a groove depth of said central longitudinal groove is in a range of from 6 to 10 mm.

* * * * *